United States Patent
Tenca et al.

(10) Patent No.: US 9,557,794 B2
(45) Date of Patent: Jan. 31, 2017

(54) SYSTEM AND METHOD FOR DISTRIBUTING ELECTRICAL POWER

(71) Applicant: General Electric Company, Schenectady, NY (US)

(72) Inventors: Pierluigi Tenca, Munich (DE); Christof Martin Sihler, Karlsruhe (DE)

(73) Assignee: General Electric Company, Niskayuna, NY (US)

( * ) Notice: Subject to any disclaimer, the term of this patent is extended or adjusted under 35 U.S.C. 154(b) by 162 days.

(21) Appl. No.: 14/535,340

(22) Filed: Nov. 7, 2014

(65) Prior Publication Data
US 2016/0132089 A1    May 12, 2016

(51) Int. Cl.
*G06F 11/00*    (2006.01)
*G06F 1/30*    (2006.01)
(Continued)

(52) U.S. Cl.
CPC ............... *G06F 1/30* (2013.01); *G06F 1/263* (2013.01); *G06F 11/3027* (2013.01); *H02H 7/261* (2013.01); *H02J 1/08* (2013.01); *H02J 1/10* (2013.01); *H02J 3/006* (2013.01); *H02J 4/00* (2013.01); *G06F 11/2221* (2013.01); *H02J 2003/001* (2013.01)

(58) Field of Classification Search
CPC ............... H02H 7/26; H02J 1/08; H02J 1/10; H02J 3/00; H02J 4/00; G06F 11/2015; G06F 1/30; G06F 11/1441; G06F 1/263
USPC .......................................................... 714/14
See application file for complete search history.

(56) References Cited

U.S. PATENT DOCUMENTS 4,435,764 A * 3/1984 El-Gohary .............. H04L 12/40
                                                    323/902
4,963,763 A    10/1990 Minagawa et al.
(Continued)

FOREIGN PATENT DOCUMENTS

GB          2445382 A       7/2008
WO     2013127575 A1       9/2013
WO     2013163043 A1      10/2013

OTHER PUBLICATIONS

European Search Report and Written Opinion issued in connection with corresponding EP Application No. 15191648.3-1804 dated Apr. 14, 2016.
(Continued)

*Primary Examiner* — Amine Riad
(74) *Attorney, Agent, or Firm* — Seema S. Katragadda

(57) ABSTRACT

A bus for distributing electrical power to a plurality of sets of electrical devices is disclosed. The bus includes one or more bus separators and a plurality of bus sections. The plurality of bus sections includes at least a first bus section and a second bus section electrically coupled to each other via a bus separator, where the first bus section is electrically connectable to a first set of electrical devices having a first importance metric and the second bus section is electrically connectable to a second set of electrical devices having a second importance metric different from the first importance metric. The bus separator is configured to isolate the first bus section and the second bus section based on occurrence of a fault condition. A Direct Current power distribution system employing the bus and a method for distributing electrical power via the bus are also disclosed.

20 Claims, 5 Drawing Sheets

(51) Int. Cl.
*H02J 1/08* (2006.01)
*H02J 1/10* (2006.01)
*H02J 3/00* (2006.01)
*H02J 4/00* (2006.01)
*G06F 1/26* (2006.01)
*G06F 11/30* (2006.01)
*H02H 7/26* (2006.01)
*G06F 11/22* (2006.01)

(56) References Cited

U.S. PATENT DOCUMENTS

| | | | |
|---|---|---|---|
| 5,225,722 A | 7/1993 | Gotou et al. | |
| 5,576,940 A * | 11/1996 | Steigerwald | H02J 1/102 363/17 |
| 5,936,318 A * | 8/1999 | Weiler | H02J 4/00 307/18 |
| 6,121,693 A * | 9/2000 | Rock | H02J 1/10 307/18 |
| 6,229,334 B1 * | 5/2001 | Kelley | G06F 13/4072 326/30 |
| 6,590,755 B1 | 7/2003 | Behr et al. | |
| 7,936,086 B2 | 5/2011 | Yue et al. | |
| 8,797,842 B2 * | 8/2014 | Dame | H04L 12/40026 361/601 |
| 8,863,840 B2 * | 10/2014 | Schultz | E21B 43/261 166/302 |
| 2003/0231440 A1 * | 12/2003 | Papallo | G06F 1/12 361/3 |
| 2005/0185052 A1 * | 8/2005 | Raisinghani | H04N 7/183 348/148 |
| 2012/0063040 A1 * | 3/2012 | Rostron | H02H 7/26 361/49 |
| 2013/0035800 A1 | 2/2013 | Kulathu et al. | |
| 2013/0054042 A1 * | 2/2013 | du Toit | H02H 7/26 700/292 |
| 2013/0215543 A1 | 8/2013 | Hoeven | |
| 2013/0270902 A1 | 10/2013 | Andersen et al. | |

OTHER PUBLICATIONS

Jae-Do et al.,"DC Ring-Bus Microgrid Fault Protection and Identification of Fault Location", Power Delivery, IEEE Transactions on Power Delivery, vol. 28, Issue: 4, pp. 2574-2584, Oct. 2013.
Di Zhang et al.,"Internal Fault Detection and Isolation for Paralleled Voltage Source Converters", Applied Power Electronics Conference and Exposition, 2009. APEC 2009. Twenty-Fourth Annual IEEE, pp. 833-839, Feb. 15-19, 2009.

* cited by examiner

SYSTEM AND METHOD FOR DISTRIBUTING ELECTRICAL POWER

BACKGROUND

Embodiments of the present disclosure relate to distribution of electrical power, and more particularly to a fault tolerant arrangement of electrical devices coupled to a bus for distributing the electrical power.

Currently, electrical buses such as busbars are being commonly used for transmission of electrical power. The buses are used for transmission of Direct Current (DC) power or Alternating Current (AC) power. Presently, DC buses are being employed to increase the availability of energy to loads that are coupled in parallel and to the DC buses.

It may be noted that the DC buses have been extensively used in subsea and marine applications for the distribution of electrical power. Generally, when a DC bus is employed in the subsea or marine applications, several electrical devices such as power sources and electrical loads are coupled in parallel and to the DC bus. Such a parallel organization of the electrical devices that are coupled to the DC bus typically renders the overall system prone to propagation of faults among the electrical devices. Moreover, a fault in any of the electrical devices in a configuration that employs the parallel organization of the electrical devices entails isolation of all the electrical devices that are coupled to the bus in the same parallel path. This isolation of all the electrical devices in turn impedes the functioning of the electrical devices in the same parallel path. Consequently, the occurrence of a fault in one electrical device adversely affects the operation of other electrical devices coupled to the DC bus.

BRIEF DESCRIPTION

In accordance with aspects of the present specification, a bus for distributing electrical power to a plurality of sets of electrical devices is disclosed. The bus includes one or more bus separators. The bus also includes a plurality of bus sections, where the plurality of bus sections comprises at least a first bus section and a second bus section electrically coupled to each other via a bus separator of the one or more bus separators, and where the first bus section is electrically connectable to a first set of electrical devices of the plurality of sets of electrical devices having a first importance metric and the second bus section is electrically connectable to a second set of electrical devices of the plurality of sets of electrical devices having a second importance metric different from the first importance metric. The bus separator is configured to isolate the first bus section and the second bus section based on occurrence of a fault condition.

In accordance with aspects of the present specification, a Direct Current (DC) power distribution system for distributing electrical power to a plurality of electrical devices is disclosed. The DC power distribution system includes a bus configured to distribute the electrical power to the plurality of electrical devices. The bus includes a plurality of bus sections, where each bus section of the plurality of bus sections is electrically connectable to one or more electrical devices having a same importance metric. The bus also includes one or more bus separators electrically coupled to the plurality of bus sections. Moreover, the DC power distribution system also includes a controller operatively coupled to the plurality of electrical devices and the one or more bus separators, and configured to monitor the plurality of electrical devices for occurrence of a fault condition. Furthermore, the one or more bus separators are configured to isolate one or more bus sections of the plurality of bus sections based on occurrence of the fault condition.

In accordance with aspects of the present specification, a method for distributing electrical power to a plurality of electrical devices via a bus having a plurality of bus sections is disclosed. The method includes assigning an importance metric to each of the plurality of electrical devices. Moreover, the method includes electrically coupling one or more electrical devices of the plurality of electrical devices having a same importance metric to a bus section of the plurality bus sections.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

The specification may be best understood with reference to the detailed figures and description set forth herein. Various embodiments are described hereinafter with reference to the figures. However, those skilled in the art will readily appreciate that the detailed description given herein with respect to these figures is for explanatory purposes as the method and the system extend beyond the described embodiments.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
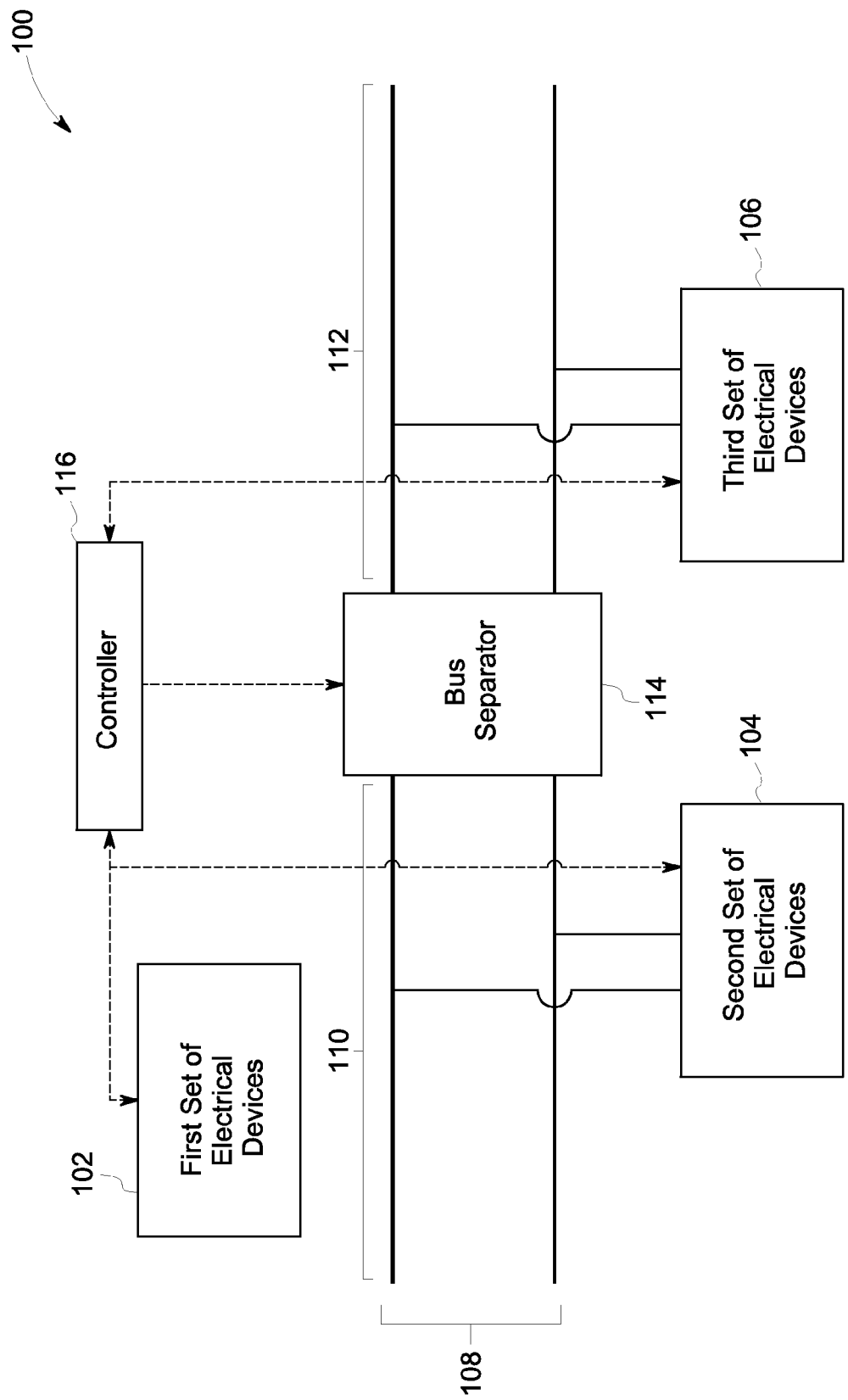
FIG. 1 is a diagrammatical illustration of a system for distributing power, in accordance with aspects of the present specification.

FIG. 1 is a diagrammatical illustration of a system 100 for distributing power, in accordance with aspects of the present specification. For the ease of illustration, the system 100 is described as being a marine or subsea system. As will be appreciated, embodiments of the present specification may also be applicable to other applications including, but not limited to, household and industrial power transmission systems.

The system 100 may include a first set of electrical devices 102, a second set of electrical devices 104, and a third set of electrical devices 106 electrically coupled to a bus 108. Each set of the electrical devices of the sets of electrical devices 102-106 may include one or more power sources or electrical loads. The one or more power sources may include controllable power sources. In one example, the first set of electrical devices 102 may include one or more power sources and one or more electrical loads. In another example, the second and third sets of electrical devices 104, 106 may include electrical loads. Accordingly, the bus 108 may serve as a common bus to which the sets of electrical devices 102-106 are coupled to.

The term "power source" as used herein may refer to an electrical device capable of supplying voltage and/or current to the bus 108. By way of example, the power sources may include, but are not limited to, batteries, sources capable of supplying a Medium Voltage Direct Current (MVDC) or a High Voltage Direct Current (HVDC), or sources capable of supplying an Alternating Current (AC) voltage. Examples of the sources capable of supplying the AC voltage may include, but are not limited to, inverters, uninterrupted power supplies (UPSs), AC power transmission lines, generators, alternators, or combinations thereof.

The term "electrical load" as used herein may be used to refer to an electrical device that may consume electricity from the bus 108. Some examples of the electrical loads may include, but are not limited to, compressors, variable frequency drives (VFDs), drilling heads, main propulsion motors of a ship, ventilation fans in underground mines, cooling pumps, illumination systems and devices, chargers of remotely operated vehicles (ROVs), supply lines for working tools, communication lines among operators, power supply of parts of various sub-systems, telemetry equipment, and the like.

As will be appreciated, each electrical device of the sets of electrical devices 102-106 may have varying degrees of importance or priority with respect to the operation of the system 100. For instance, some electrical devices of the sets of electrical devices 102-106 may be essential for the functioning of the system 100, and may be referred to as "essential electrical devices." In a non-limiting example, electrical devices such as the compressors, VFDs, drilling heads, main propulsion motors, ventilation fans in underground mines, and cooling pumps may be essential for the system 100 to operate.

Moreover, some other electrical devices from the sets of electrical devices 102-106 may not be essential but are still important for the functioning of the system 100, and may be referred to as "important electrical devices." In a non-limiting example, electrical devices such as the illumination systems and devices, certain UPSs, chargers of ROVs, and supply lines for the working tools may not be essential but are important for the system 100.

Furthermore, some electrical devices from the sets of the electrical devices 102-106 may not be important for the functioning of the system 100, and may be referred to as "unimportant electrical devices." More particularly, loss of such unimportant electrical devices may not be critical to the basic operation of the system 100 or may have minimal impact on the operation of the system 100. Examples of such unimportant electrical devices may include, but are not limited to, the communication lines among operators, illumination devices of certain areas, power supply for parts of the redundant sub-systems, and telemetry equipment.

In accordance with aspects of the present specification, each electrical device of the sets of electrical devices 102-106 may be assigned an importance metric. The importance metric may be assigned prior to coupling the sets of electrical devices 102-106 to the bus 108. The importance metric may be indicative of an importance or priority of the corresponding electrical device. In accordance with aspects of the present specification, assigning the importance metric may entail categorizing the electrical devices of the sets of electrical devices 102-106 in accordance with their respective importance or priority to the operation of the system 100.

In some non-limiting examples, the importance metric may be represented by category labels or tags such as "high," "medium," "low," "essential," "important," "unimportant," or combinations thereof. In certain embodiments, the importance metric may be in the form of numeric representation such as 1, 2, 3, and the like. In the embodiment of FIG. 1, the sets of electrical devices 102-106 have been categorized into two categories for the ease of illustration. By way of example, one of two types of importance metric is assigned to each electrical device of the sets of electrical devices 102-106. More particularly, the essential electrical devices and the important electrical devices may be assigned an importance metric of "high." The "high" metric is indicative of the highest priority. Similarly, the unimportant electrical devices may be assigned an importance metric of "low." The "low" metric is indicative of the lowest priority. In one example, each electrical device of the first set of electrical devices 102 and each electrical device of the second set of electrical devices 104 may be assigned a "high" importance metric and each electrical device of the third set of electrical devices 106 may be assigned a "low" importance metric. In certain embodiments of the present specification (see FIGS. 2-4), the electrical devices of the sets of electrical devices 102-106 may be categorized in more than two categories depending on their respective importance and/or priority.

Moreover, as noted previously, the sets of electrical devices 102-106 are electrically coupled to the bus 108. In one embodiment, the bus 108 may be a DC bus capable of carrying a DC current. In another embodiment, the bus 108 may be an AC bus capable of carrying an AC current. As previously noted, currently available techniques entail electrically coupling the electrical loads and power sources to the bus 108. Unfortunately, a fault in any of the electrical loads or power sources calls for disabling/isolating all the loads that are coupled to the bus. The system 100 aids in circumventing the shortcomings of the currently available systems. More particularly, a hierarchical arrangement of the electrical devices that are connected to a common bus is presented. This arrangement aids in isolating the faulty electrical loads/power sources, thereby minimizing the effect of the faulty electrical loads/power sources on the functioning of other electrical loads/power sources.

To that end, the common bus 108 may include a plurality of bus sections. For ease of illustration, the common bus 108 of FIG. 1 is shown as including two bus sections, namely a first bus section 110 and a second bus section 112. However, embodiments of the system 100 that include a bus having more than two bus sections are also contemplated (see FIGS. 2-4). In one embodiment, the number of bus sections may be selected based on the importance metrics assigned to the electrical devices. By way of example, if the electrical devices to be coupled to the common bus 108 are categorized into two sets based on the corresponding importance metrics then the common bus 108 may be configured to include two bus sections. In a similar fashion, if the electrical devices are assigned three different importance metrics, then the common bus 108 may include three bus sections.

In addition, the system 100 may include a bus separator 114. The bus separator 114 is configured to electrically couple the first bus section 110 to the second bus section 112. In one embodiment, the bus separator 114 may include one or more switching elements configured to aid in selectively coupling or isolating the first bus section 110 to/from the second bus section 112.

In accordance with aspects of the present specification, the electrical devices may be categorized into two or more sets based on corresponding importance metrics. Additionally, each set of electrical devices may be electrically coupled to a corresponding bus section. For example, all the electrical devices that have been assigned a "high" importance metric may be coupled to the first bus section 110. Similarly, all the electrical devices that have been assigned a "low" importance metric may be coupled to the second bus section 112. Accordingly, in such an arrangement, the electrical devices having different importance metrics are coupled to different bus sections of the bus 108. Consequently, this arrangement of the sets of electrical devices 102-106 aids in ensuring that the electrical devices having different importance metrics are not coupled to a given bus section. More particularly, in accordance with aspects of the present specification, electrical loads/power sources having the same or substantially similar importance metrics are coupled to a common bus section, while electrical loads/power sources having other importance metrics are coupled to different corresponding bus sections. Furthermore, when a fault pertaining to any electrical device coupled to the second bus section 112 is detected, the bus separator 114 may be employed to disable/isolate only the second bus section 112, while allowing the electrical devices coupled to the first bus section 110 continue to operate.

Additionally, the system 100 may further include a controller 116 operatively coupled to the sets of electrical devices 102-106 and the bus separator 114. The controller 116 may be implemented using various hardware elements including, but not limited to, a suitable arrangement of one or more of a general purpose processor, a micro controller, a memory, integrated circuits, and the like. The hardware elements may be disposed on a printed circuit board. The functionality of the controller 116 may also be imparted using software or a combination of the hardware elements and the software.

The controller 116 may be configured to monitor the system 100 and more particularly to detect occurrence of one or more fault conditions in the sets of electrical devices 102-106. Examples of the fault conditions may include, but are not limited to, a short circuit condition, an over current condition, an over temperature condition, malfunctioning of one or more of the electrical devices 102-106, or combinations thereof. In some embodiments, the controller 116 may be configured to detect the occurrence of the one or more fault conditions based on one or more signals received from one or more sensing elements (not shown) disposed on or about the electrical devices in the sets of electrical devices 102-106.

Once the controller 116 detects a fault condition in one or more electrical devices of the sets of electrical devices 102-106, the controller 116 may be configured to communicate a first control signal to the bus separator 114. The bus separator 114 may be configured to isolate the first bus section 110 from the second bus section 112 upon receipt of the first control signal. By way of example, if a fault condition occurs in the third set of electrical devices 106 that include electrical devices that have been tagged as "unimportant" or have been assigned a low priority, the bus separator 114 may be configured to isolate the second bus section 112 from the first bus section 110 without impeding the functioning of the sets of the electrical devices 102 and 104 that have been tagged as "essential" or "important" and are coupled to the first bus section 110.

Moreover, as previously noted, the sets of electrical devices 102-106 may include controllable power sources. In such a configuration of the system 100, the controller 116 may be configured to communicate a second control signal to at least one controllable power source based on the occurrence of the fault condition. In particular, the second control signal may be communicated to one or more controllable power sources that are coupled a faulty bus section. The second control signal may be indicative of a need to reduce a voltage supplied by the corresponding controllable power source to the respective bus section of the plurality of bus sections 110, 112. In certain embodiments, the second control signal may be communicated to the at least one controllable power source prior to communicating the first control signal to the bus separator 114. In response to the receipt of the second control signal, the corresponding controllable power source may be configured to reduce the voltage supplied to the associated bus section. For example, the reduced voltage level may be substantially close to zero. More particularly, the voltage level supplied by the controllable power source may be reduced prior to effecting the isolation of the first bus section 110 from the second bus section 112. Consequently, such a reduction in the voltage level supplied to the bus section also results in reduced current levels in the respective bus section.

In some embodiments, the sets of electrical devices 102-106 may include at least one current transfer device. In accordance with aspects of the present specification, the current transfer device may also be assigned a respective importance metric. The controller 116 may be configured to selectively control the at least one current transfer device to facilitate a temporary transfer of a current from the faulty bus section to the current transfer device. The current transfer device is capable of creating a temporary short circuit for a controllable duration to aid in the transfer of the current. To that end, the controller 116 may be configured to communicate a third control signal to the current transfer device on occurrence of the fault condition. The third control signal may be indicative of a need to create the short circuit for the controllable duration so that transfer of the current from the faulty bus section to the current transfer device may be initiated.

In one embodiment, the controller 116 may be configured to communicate the third control signal to a current transfer device that has an importance metric of higher priority in comparison to importance metrics associated with the electrical devices affected by the fault condition. For example, if the fault condition occurs in the set of electrical devices 106, the controller 116 may be configured to communicate the third control signal to a current transfer device in any of the sets of electrical devices 102, 104 to temporarily transfer the current from the second bus section 112 to the current transfer device associated with the sets of electrical devices 102, 104.

The transfer of the current from the faulty bus section (for example, the second bus section 112) to the current transfer device in the other bus section (for example, the first bus section 110) aids in reducing the current being supplied to the faulty bus section. Moreover, the third control signal may be communicated to the current transfer device associated with the sets of electrical devices 102, 104 prior to communicating the first control signal to the bus separator 114 such that the current being supplied to the faulty bus section is reduced to a lower level prior to effecting the isolation of the first bus section 110 from the second bus section 112. Consequent to the reduction in the current being supplied to the faulty bus section, the bus separator coupled to the faulty bus section may be operated to handle the reduced current level, thereby improving reliability of the system 100.

Implementing the system 100 as described hereinabove provides a fault tolerant arrangement of the sets of electrical devices 102-106 on the bus 108. More particularly, the common bus 108 is divided into a plurality of bus sections 110, 112 and a bus separator 114 is used to connect two bus sections 110, 112. During normal operation of the system 100, the bus separator 114 aids in electrically coupling the two bus sections 110, 112. However, in the event of a fault in an electrical device, the bus separator 114 is configured to decouple the two sections even under full load, thereby isolating the "faulty" bus section from the operating bus section.

Figure 2:
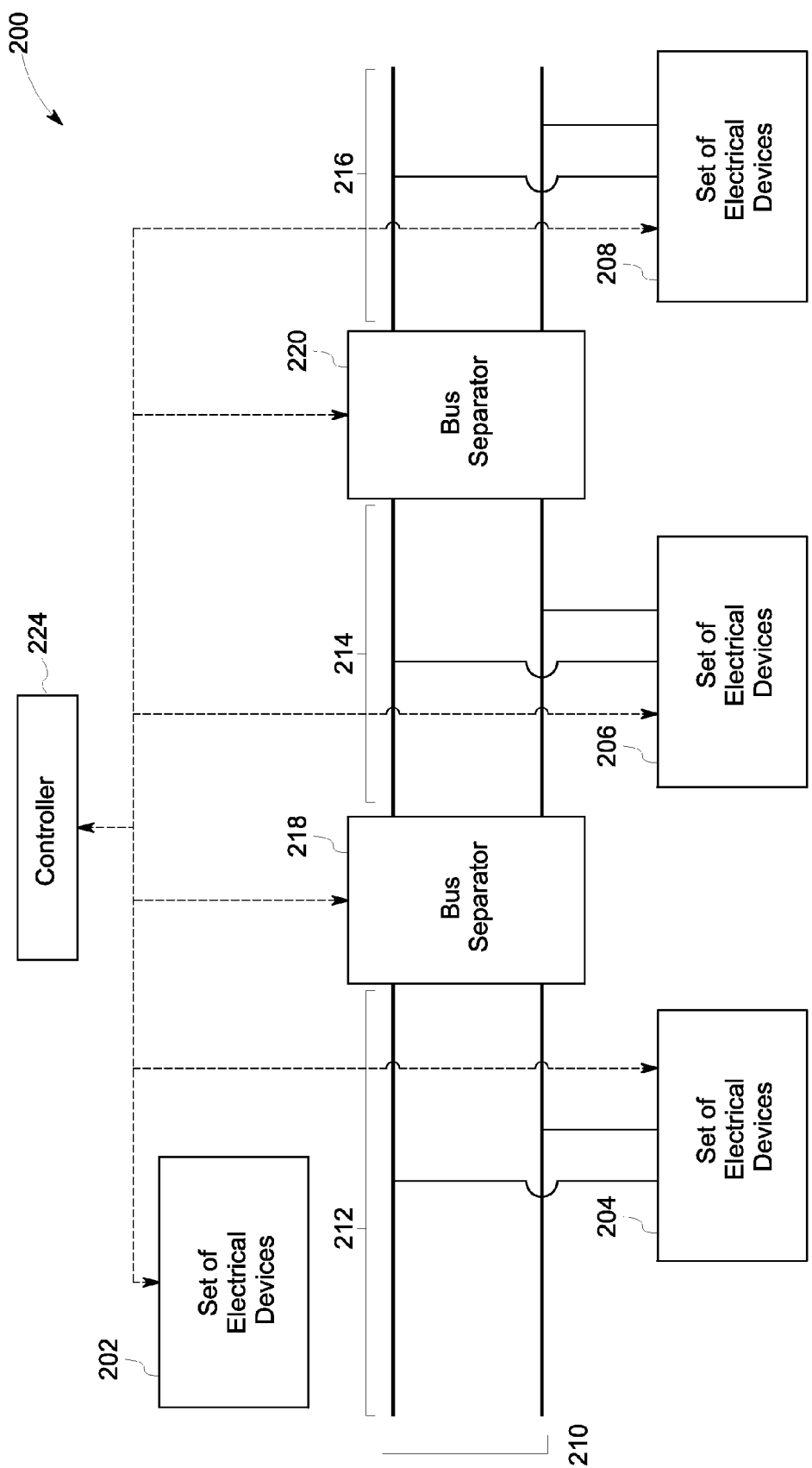
FIG. 2 is a diagrammatical illustration of a system having a series configuration of a bus for distributing power, in accordance with aspects of the present specification.

FIG. 2 is a diagrammatical illustration of a system 200 having a series configuration of a bus for distributing power, in accordance with aspects of the present specification. More particularly, the system 200 entails an arrangement where a plurality of bus sections is coupled in the series configuration. FIG. 2 will be described in conjunction with the elements of FIG. 1.

The system 200 includes a plurality of sets of electrical devices 202, 204, 206, and 208 electrically coupled to a bus 210. The bus 210 may be divided into a plurality of bus sections 212, 214, and 216. The bus sections 212-216 are electrically coupled via one or more bus separators such as bus separators 218, 220. More particularly, the bus section 212 may be electrically coupled to the bus section 214 via the bus separator 218, and the bus section 214 may be electrically coupled to the bus section 216 via the bus separator 220. The system 200 may further include a controller 224 operatively coupled to the sets of electrical devices 202-208 and the bus separators 218, 220. It may be noted that the configuration and/or functionality of the sets of electrical devices 202-208, the bus 210, the bus separators 218 and 220, and the controller 224 may be similar to the corresponding elements of FIG. 1.

Each electrical device in the sets of electrical devices 204-208 may be assigned an importance metric. For example, each electrical device may be categorized according to a respective priority. In some embodiments, the set of electrical devices 202 may include one or more power sources and/or one or more electrical loads having the same importance metric, while the sets of electrical devices 204-208 may include electrical loads. In one example, the sets of electrical devices 202, 204 may be assigned the same importance metric. Moreover, the set of electrical devices 206 may be assigned a different importance metric. Also, the set of electrical devices 208 may be assigned yet another importance metric.

As previously noted, the electrical devices that have the same importance metric are coupled to the same bus section of the plurality of bus sections. Therefore, the sets of electrical devices 202 and 204 are shown as being coupled to the bus section 212. The set of electrical devices 206 is shown being coupled to the bus section 214, while the electrical devices 208 is shown being coupled to the bus section 216.

The bus sections 212, 214, and 216 are arranged based on a determined order of the importance metric associated the electrical devices coupled therewith. In the series configuration of FIG. 2, the sets of electrical devices 202-208 may be coupled to the respective bus sections 212-216 in a descending order of corresponding importance metrics. In one embodiment, the sets of electrical devices 202 and 204 may have an importance metric that is indicative of the highest priority. By way of example, the sets of electrical devices 202 and 204 may include the essential electrical devices, as previously noted. In another embodiment, the set of electrical devices 206 may have an importance metric that is indicative of a medium priority. For example, the set of electrical devices 206 may include important electrical devices. In yet another embodiment, the set of electrical devices 208 may have an importance metric that is indicative of a lowest priority. By way of example, the set of electrical devices 208 may include all unimportant electrical devices, as previously noted. A series configuration having the sets of electrical devices 202-208 coupled to the respective bus sections 212-216 in an ascending order of associated importance metric is also contemplated. Moreover, categorization of the sets of electrical devices 202-208 into more than three categories is also contemplated.

The bus sections 212, 214, 216 may be operatively coupled via use of bus separators to form the common bus 210. In a presently contemplated configuration, the bus section 212 is operatively coupled to the bus section 214 via the bus separator 218. In a similar fashion, the bus section 214 is operatively coupled to the bus section 216 via the bus separator 220.

In accordance with the aspects of the present specification, if the controller 224 detects a fault condition in any electrical device in the set of electrical devices 208, the controller 224 may be configured to communicate a control signal to the bus separator 220. In response to the receipt of the control signal, the bus separator 220 may be configured to isolate the bus section 216 from the bus section 214 as the set of electrical devices 208 are coupled to the bus section 216. Isolating the bus section 216 thereby aids in ensuring that the functionalities of the sets of electrical devices 202-206 are not impeded due to the fault condition associated with any electrical device in the set of electrical devices 208. Similarly, if the controller 224 detects a fault condition in any electrical device in the set of electrical devices 206, the controller 224 may be configured to communicate the control signal to the bus separator 218. In response to the receipt of the control signal, the bus separator 218 may be configured to isolate the bus section 214 from the bus section 212 as the electrical devices 206 are coupled to the bus section 214.

In the embodiment of FIG. 2, disabling/isolating the bus section 214 may result in isolation of the bus sections 212 and 216. Consequently, the set of electrical devices 208 coupled to the bus section 216 may be rendered inoperable. This situation may be circumvented via use of exemplary embodiment of configuration presented in FIGS. 3-4.

Figure 3:
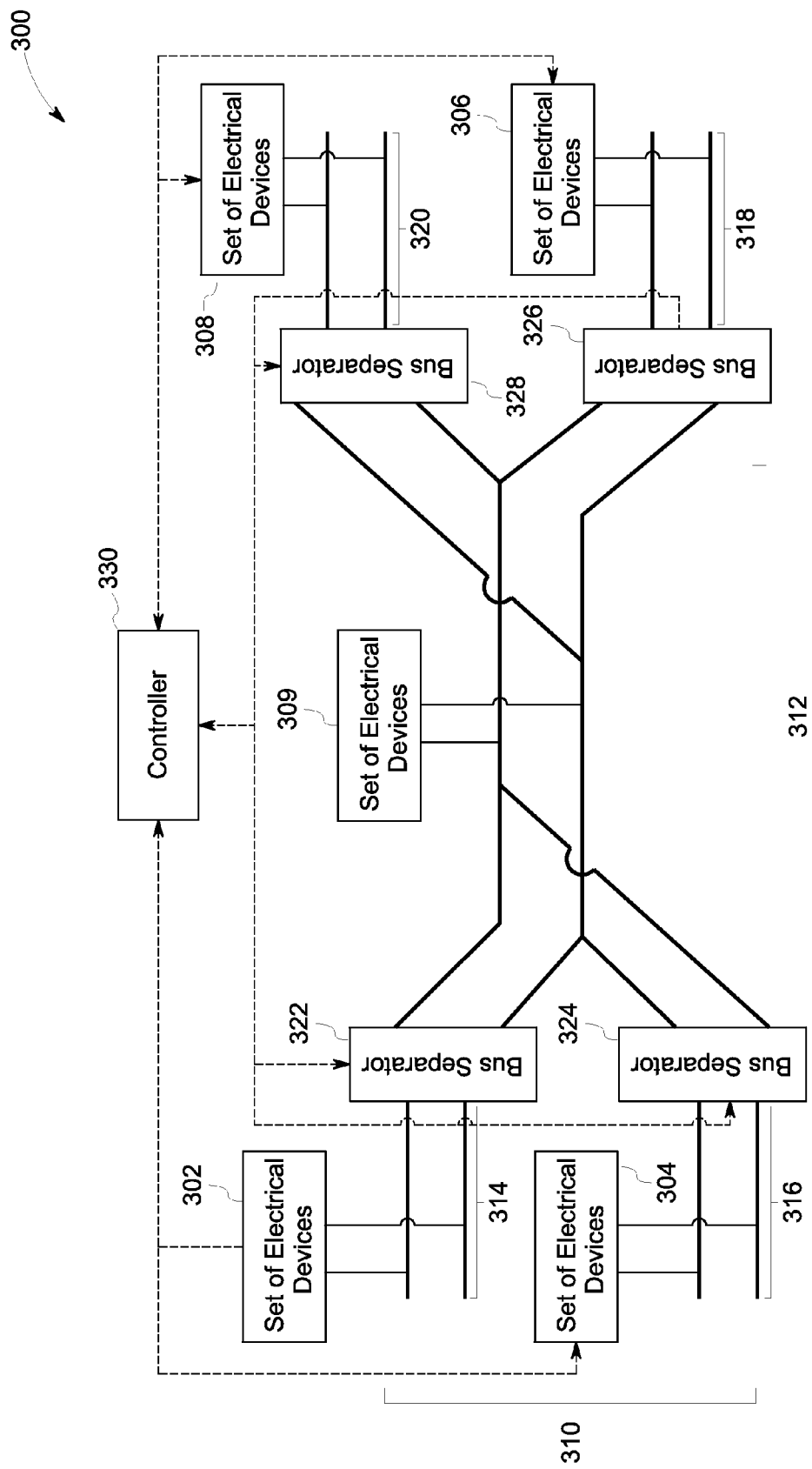
FIG. 3 is a diagrammatical illustration of a system having a star configuration of a bus for distributing power, in accordance with aspects of the present specification.

FIG. 3 is a diagrammatical illustration of a system 300 having a star configuration of a bus for distributing power, in accordance with aspects of the present specification. More particularly, the system 300 entails a configuration where a plurality of bus sections is arranged in the star configuration. FIG. 3 will be described in conjunction with the elements of FIG. 1.

The system 300 includes a plurality of sets of electrical devices 302, 304, 306, 308, and 309 electrically coupled to a bus 310. The bus 310 may be divided into a plurality of bus sections such as bus sections 312, 314, 316, 318, and 320. The bus sections 312-320 are electrically coupled via one or more bus separators such as bus separators 322, 324, 326, and 328, as depicted in FIG. 3. More particularly, the bus sections 314, 316, 318, and 320 may be electrically coupled to the bus section 312 via the bus separators 322, 324, 326, and 328, respectively. The system 300 may further include a controller 330 operatively coupled to the sets of electrical devices 302-309 and the bus separators 322-328. It may be noted that the configuration and/or functionality of the sets of electrical devices 302-309, the bus 310, the bus separators 322-328, and the controller 330 may be similar to the corresponding elements of FIG. 1.

The sets of electrical devices 302-309 may include power sources and/or electrical loads. Each electrical device of the sets of electrical devices 302-309 may be assigned an importance metric. For example, in the configuration of FIG. 3, electrical devices in the sets of electrical devices 302-309 are assigned four different types of importance metrics. Moreover, electrical devices coupled to a common bus section have the same importance metric, while importance metrics associated with electrical devices coupled to other bus sections are different.

Additionally, the star configuration of the bus sections 312-320 enables the sets of electrical devices 302-309 to be coupled with each other in parallel. Consequently, if the controller 330 detects a fault condition in any electrical device associated with a given set of electrical devices, the controller 330 may be configured to communicate a control signal to a corresponding bus separator. In response to the receipt of the control signal, the bus separator may be configured to isolate the corresponding bus section from the other bus sections. The star configuration of the bus sections advantageously allows a faulty bus section to be isolated while ensuring the continued operation of the other sets of electrical devices.

For example, if the controller 330 detects a fault condition in any electrical device in the set of electrical devices 308, the controller 330 may be configured to communicate a control signal to the bus separator 328. In response to the receipt of the control signal, the bus separator 328 may be configured to isolate the bus section 320 from the other bus sections. Therefore, isolation of the faulty bus section 320 ensures the continued operation of the sets of electrical devices 302, 304, 306, and 309.

Figure 4:
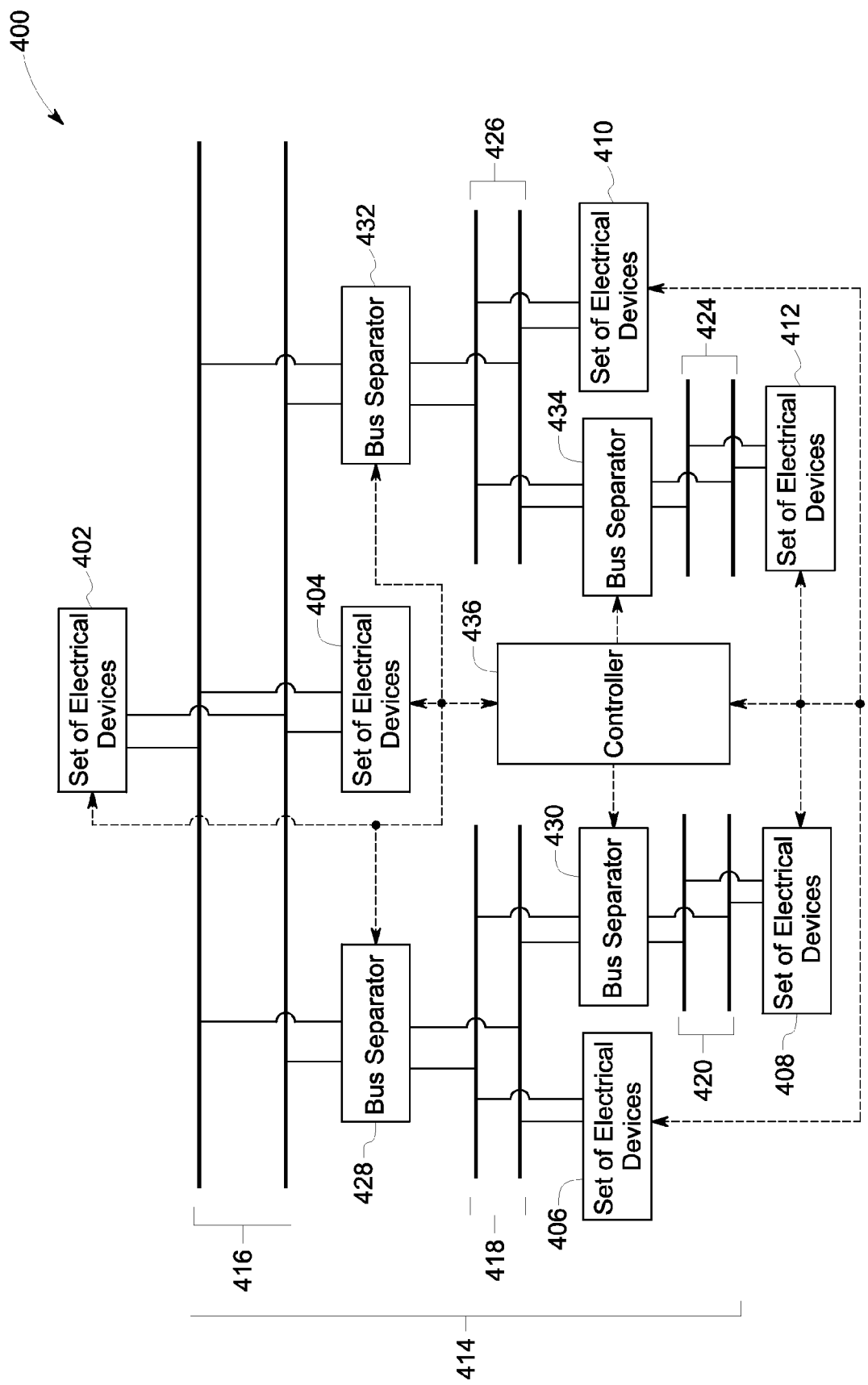
FIG. 4 is a diagrammatical illustration of a system having a tree configuration of a bus for distributing power, in accordance with aspects of the present specification.

FIG. 4 is a diagrammatical illustration of a system 400 having a tree configuration of a bus for distributing power, in accordance with aspects of the present specification. More particularly, the system 400 entails a configuration where a plurality of bus sections is arranged in a tree configuration. FIG. 4 will be described in conjunction with the elements of FIG. 1.

The system 400 includes a plurality of sets of electrical devices 402, 404, 406, 408, 410, and 412 electrically coupled to a bus 414. The bus 414 may be divided into a plurality of bus sections such as bus sections 416, 418, 420, 424, and 426. The bus sections 416-426 are electrically coupled via one or more bus separators such as bus separators 428, 430, 432, and 434. More particularly, the bus section 418 may be electrically coupled to the bus section 416 via the bus separator 428. In a similar fashion, the bus section 426 may be electrically coupled to the bus section 416 via the bus separator 432. The bus section 420 may be electrically coupled to the bus section 418 via the bus separator 430. Also, the bus section 424 may be electrically coupled to the bus section 426 via the bus separator 434.

In the configuration of FIG. 4, the sets of electrical devices 402-412, the bus sections 416-426, and/or the bus separators 428-434 are arranged to form one or more parallel paths. By way of example, the sets of electrical devices 402, 404, and the bus section 416 may form a first parallel path. Similarly, the sets of electrical devices 406, 408, the bus sections 418, 420, and the bus separator 430 that are coupled directly or indirectly to the bus separator 428 may form a second parallel path. Moreover, the sets of electrical devices 410, 412, the bus sections 424, 426, and the bus separator 434 that are coupled directly or indirectly to the bus separator 432 may form a third parallel path. In the embodiment of FIG. 4, three parallel paths are shown for the ease of illustration. Systems having more than three or less than three parallel paths are also contemplated.

The system 400 may further include a controller 436 operatively coupled to the sets of electrical devices 402-412 and the bus separators 428-434. It may be noted that the configuration and/or functionality of the sets of electrical devices 402-412, the bus 410, the bus separators 428-434, and the controller 436 may be similar to the corresponding elements of FIG. 1.

Each electrical device of the sets of electrical devices 402-412 may be assigned a corresponding importance metric. For example, in the configuration of FIG. 4, the sets of electrical devices 402-412 are assigned six different importance metrics. More particularly, the sets of electrical devices 402-412 are classified into six categories depending on a priority corresponding to each electrical device of the sets of electrical devices 402-412.

In accordance with aspects of the present specification, all electrical devices coupled to a common bus section have the same importance metric, while the electrical devices coupled to other bus sections have different importance metrics. More particularly, in the configuration of FIG. 4, the sets of electrical devices 402 and 404 may have highest priority and are directly coupled to the bus section 416. The set of electrical devices 408 coupled to the bus section 418 may have a lower priority than that of the set of electrical devices 406 coupled to the bus section 420. Similarly, the set of electrical devices 412 coupled to the bus section 424 may have lower priority than the set of electrical devices 410 coupled to the bus section 426.

In the configuration of FIG. 4, if the controller 436 detects a fault condition in any electrical device associated with a given set of electrical devices, the controller 436 may be configured to communicate a control signal to a corresponding bus separator. In response to the receipt of the control signal, the bus separator may be configured to isolate the corresponding bus section from the other bus sections. The tree configuration of the bus sections advantageously allows a faulty bus section to be isolated while ensuring the continued operation of the other sets of electrical devices.

By way of example, if the controller 436 detects a fault condition in any electrical device in the set of electrical devices 408, the controller 436 may be configured to communicate a control signal to the bus separator 430. In response to the receipt of the control signal, the bus separator 430 may be configured to isolate the bus section 420 from the bus section 418. Therefore, isolation of the faulty bus section 420 ensures the continued operation of other electrical devices in the first parallel path, the second parallel path, and the third parallel path. In a similar fashion, if a fault condition is detected by the controller 436 in any electrical device of the set of electrical devices 406, the controller 436 may be configured to communicate a control signal to the bus separator 428. In response to the receipt of the control signal, the bus separator 428 is configured to isolate the bus section 418 from the bus section 416. Isolation of the faulty bus section 418 associated with the set of electrical devices 406 aids in ensuring the continued operation of the electrical devices coupled in the first and third parallel paths.

Figure 5:
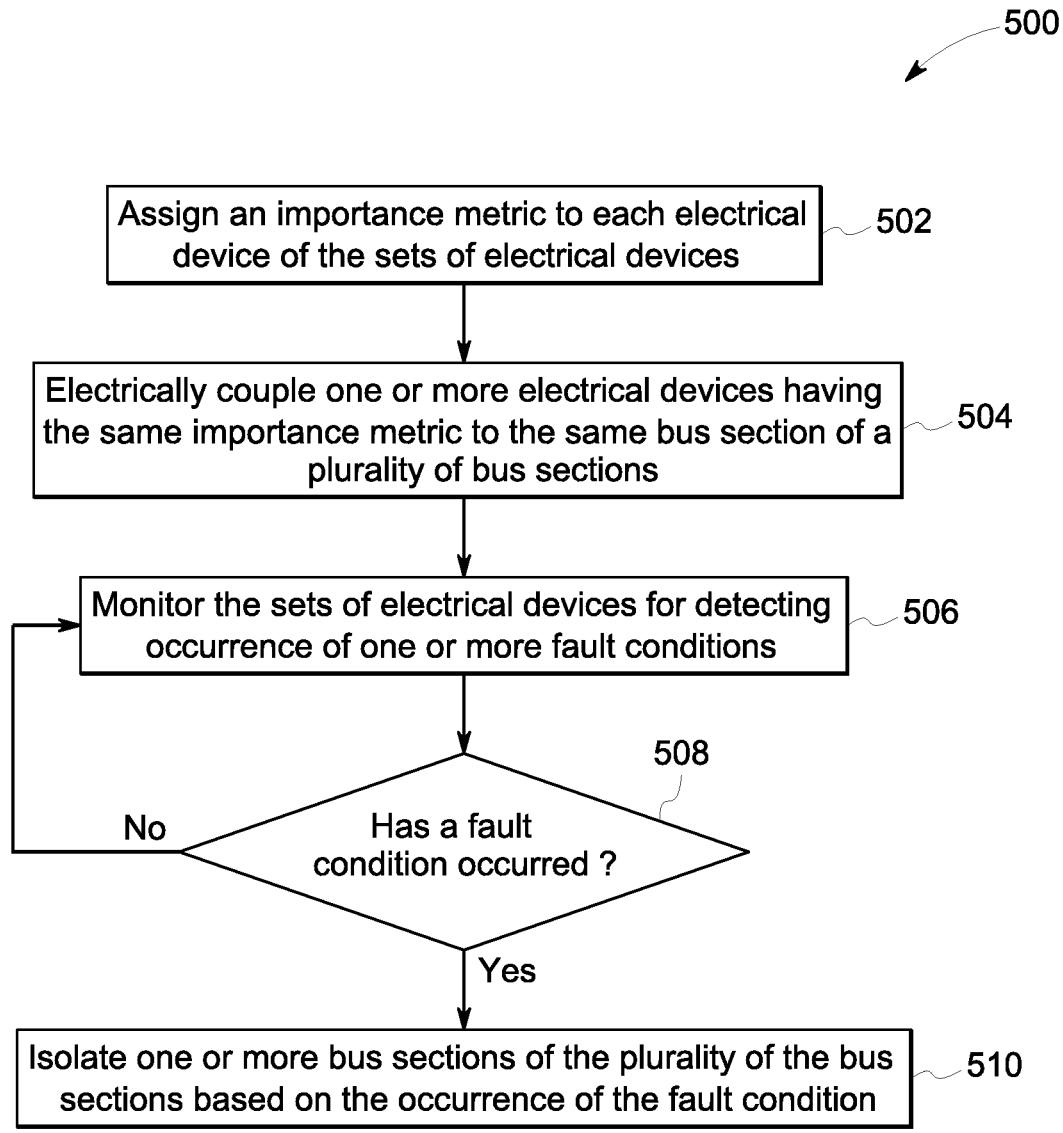
FIG. 5 depicts a flow chart illustrating an example method for distributing electrical power, in accordance with aspects of the present specification.

Turning now to FIG. 5, a flow chart 500 illustrating an example method for distributing electrical power, in accordance with aspects of the present specification is depicted. FIG. 5 will be described in conjunction with the elements of FIG. 1. It may be noted that steps of the example method described herein are also applicable to the systems of FIGS. 2-4.

As previously noted, the system 100 of FIG. 1 includes a plurality of sets of electrical devices such as the sets of electrical devices 102, 104, and 106 electrically coupled to a bus 108. The bus 108 includes a plurality of bus sections such as a first bus section 110 and a second bus section 112 electrically coupled to each other via a bus separator 114. The bus 108 is configured to distribute electrical power among the sets of electrical devices 102-106.

At step 502, an importance metric may be assigned to each electrical device of the sets of electrical devices 102-106. The importance metric may be indicative of an importance or priority of the corresponding electrical device, as previously noted. In one embodiment, assigning the importance metric may entail categorizing the electrical devices in the sets of electrical devices 102-106 in accordance with their respective priorities.

In one example, one or more electrical devices having the same importance metric are electrically coupled to the same bus section of the plurality of bus sections, as indicated by step 504. For example, as depicted in FIG. 1, electrical devices that are coupled to the first bus section 110 may have the same importance metric. Similarly, the electrical devices coupled to the second bus section 112 may have the same importance metric which is different from the importance metric assigned to the electrical devices that are coupled to the first bus section 110.

Moreover, at step 506, the controller 116 is configured to monitor the sets of electrical devices 102-106 for detecting occurrence of one or more fault conditions. The one or more fault conditions may include, but are not limited to, a short circuit condition, an over current condition, an over temperature condition, malfunctioning, or combinations thereof of one or more of the electrical devices 102-106.

Subsequently, at step 508, a check may be carried to determine if a fault condition has occurred. At step 508, if it is determined that no fault condition has occurred, control may be transferred back to step 506. However, at step 508, if it is determined that the fault condition has occurred, a control signal is communicated to a corresponding bus separator. In one embodiment, the controller 116 may be configured to communicate the control signal to a corresponding bus separator.

Furthermore, at step 510, one or more bus sections of the plurality of the bus sections may be isolated based on the occurrence of the fault condition. In one embodiment, the bus separator 114 may be configured to isolate the first bus section 110 from the second bus section 112 on receipt of the control signal from the controller 116.

Any of the foregoing steps and/or system elements may be suitably replaced, reordered, or removed, and additional steps and/or system elements may be inserted, depending on the needs of a particular application, and that the systems of the foregoing embodiments may be implemented using a wide variety of suitable processes and system elements and are not limited to any particular computer hardware, software, middleware, firmware, microcode, and the like.

The systems and method for distributing electrical power described hereinabove provides a highly fault tolerant arrangement for distributing electrical power. More particularly, the electrical devices having different importance metrics are coupled to different bus sections. Specifically, the electrical devices are coupled to different bus sections based on the corresponding importance metric and/or priorities. This arrangement aids in isolating bus sections that are associated with faulty electrical devices, while allowing normal operation of other electrical devices.

Furthermore, the foregoing examples, demonstrations, and method steps such as those that may be performed by the system may be implemented by suitable code on a processor-based system, such as a general-purpose or special-purpose computer. Different implementations of the systems and methods may perform some or all of the steps described herein in different orders, parallel, or substantially concurrently. Furthermore, the functions may be implemented in a variety of programming languages, including but not limited to C++ or Java. Such code may be stored or adapted for storage on one or more tangible, computer readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following claims.

The invention claimed is:

1. A bus for distributing electrical power to a plurality of electrical devices, the bus comprising:
    one or more bus separators; and
    a plurality of bus sections, wherein each bus section of the plurality of bus sections is electrically connectable to one or more electrical devices of the plurality of electrical devices having a same importance metric, wherein the plurality of bus sections is arranged based on a determined order of the importance metric associated with the plurality of electrical devices, and
    wherein the one or more bus separators are configured to isolate one or more bus sections of the plurality of bus sections based on an occurrence of a fault condition.

2. The bus of claim 1, wherein the bus is a Direct Current (DC) bus or an Alternating Current (AC) bus.

3. The bus of claim 1, wherein the bus is configured for use in a marine system.

4. The bus of claim 1, wherein the plurality of electrical devices comprises an electrical load, a power source, or a combination thereof.

5. The bus of claim 1, wherein the importance metric associated with the plurality of electrical devices is indicative of a priority associated with each of the corresponding electrical devices.

6. A Direct Current (DC) power distribution system for distributing electrical power to a plurality of electrical devices, the DC power distribution system comprising:
 a bus configured to distribute the electrical power to the plurality of electrical devices, wherein the bus comprises:
  a plurality of bus sections, wherein each bus section of the plurality of bus sections is electrically connectable to one or more electrical devices of the plurality of electrical devices having a same importance metric, wherein the plurality of bus sections is arranged based on a determined order of the importance metric associated with the plurality of electrical devices;
  one or more bus separators electrically coupled to the plurality of bus sections; and
 a controller operatively coupled to the plurality of electrical devices and the one or more bus separators, and configured to monitor the plurality of electrical devices for an occurrence of a fault condition,
 wherein the one or more bus separators are configured to isolate one or more bus sections of the plurality of bus sections based on the occurrence of the fault condition.

7. The DC power distribution system of claim 6, wherein the DC power distribution system is configured for use in a marine system.

8. The DC power distribution system of claim 6, wherein the plurality of electrical devices comprises electrical loads, power sources, or combinations thereof.

9. The DC power distribution system of claim 6, wherein the importance metric is indicative of a priority associated with a corresponding electrical device of the plurality of electrical devices.

10. The DC power distribution system of claim 6, wherein the controller is further configured to communicate a first control signal to a corresponding bus separator of the one or more bus separators based on the occurrence of the fault condition.

11. The DC power distribution system of claim 6, wherein the plurality of electrical devices comprises at least one controllable power source.

12. The DC power distribution system of claim 11, wherein the controller is further configured to communicate a second control signal to the at least one controllable power source based on the occurrence of the fault condition, and wherein the second control signal is indicative of a need to reduce a voltage supplied by the at least one controllable power source to the respective bus section of the plurality of bus sections.

13. The DC power distribution system of claim 6, further comprising at least one current transfer device electrically coupled to at least one bus section of the plurality of bus sections, wherein the at least one current transfer device is capable of creating a temporary short circuit for a controllable duration.

14. The DC power distribution system of claim 13, wherein the controller is further configured to communicate a third control signal to the at least one current transfer device based on the occurrence of the fault condition, and wherein the third control signal is indicative of a need to create the temporary short circuit of the at least one current transfer device for the controllable duration.

15. The DC power distribution system of claim 6, wherein the determined order is a descending order of the importance metric or an ascending order of the importance metric.

16. The DC power distribution system of claim 6, wherein the plurality of bus sections is arranged in a star configuration, a tree configuration, or a combination thereof.

17. A method for distributing electrical power to a plurality of electrical devices via a bus comprising a plurality of bus sections, the method comprising:
 assigning an importance metric to each of the plurality of electrical devices; and
 electrically coupling one or more electrical devices of the plurality of electrical devices having a same importance metric to a bus section of the plurality bus sections; and
 arranging the plurality of bus sections based on a determined order of the importance metric associated with the plurality of electrical devices.

18. The method of claim 17, wherein assigning the importance metric to each of the plurality of electrical devices comprises categorizing the plurality of electrical devices based on respective priorities.

19. The method of claim 17, further comprising monitoring the plurality of electrical devices for detecting an occurrence of a fault condition in the plurality of electrical devices.

20. The method of claim 19, further comprising isolating one or more bus sections of the plurality of the bus sections based on the occurrence of the fault condition.

* * * * *